Dec. 22, 1953          W. L. ROMICK                2,663,571
                DUAL AXLE UNIT FOR MOTOR VEHICLES
Filed June 2, 1952                          7 Sheets-Sheet 1

INVENTOR
William L. Romick
BY
Cameron, Kerkam & Sutton
ATTORNEYS

Dec. 22, 1953 W. L. ROMICK 2,663,571
DUAL AXLE UNIT FOR MOTOR VEHICLES
Filed June 2, 1952 7 Sheets-Sheet 2

INVENTOR
William L. Romick
BY
Cameron, Kerkam & Sutton
ATTORNEYS

Dec. 22, 1953  W. L. ROMICK  2,663,571
DUAL AXLE UNIT FOR MOTOR VEHICLES
Filed June 2, 1952  7 Sheets-Sheet 3
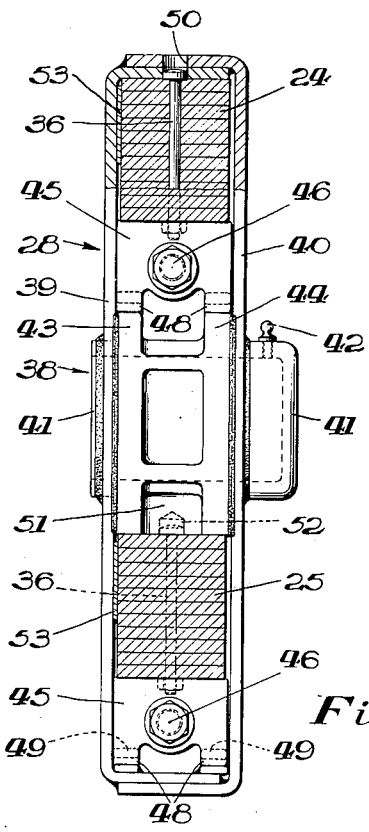
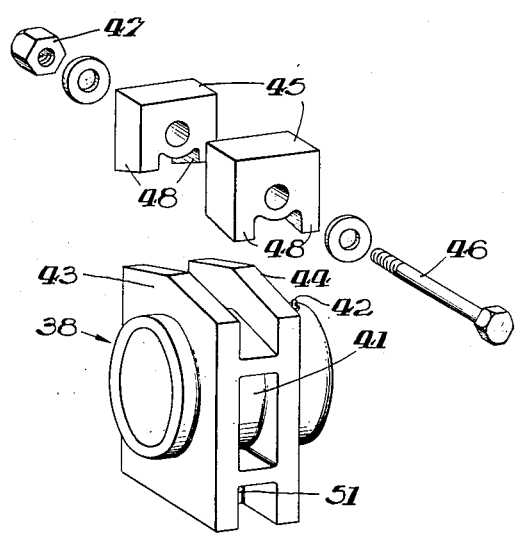
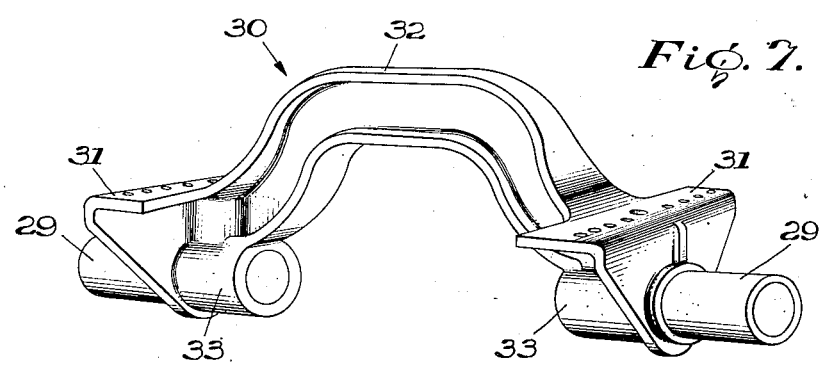
INVENTOR
William L. Romick.
BY
Cameron, Kerkam & Sutton
ATTORNEYS Dec. 22, 1953  W. L. ROMICK  2,663,571
DUAL AXLE UNIT FOR MOTOR VEHICLES
Filed June 2, 1952  7 Sheets-Sheet 4

INVENTOR
William L. Romick
BY Cameron, Kerkam & Sutton
ATTORNEYS

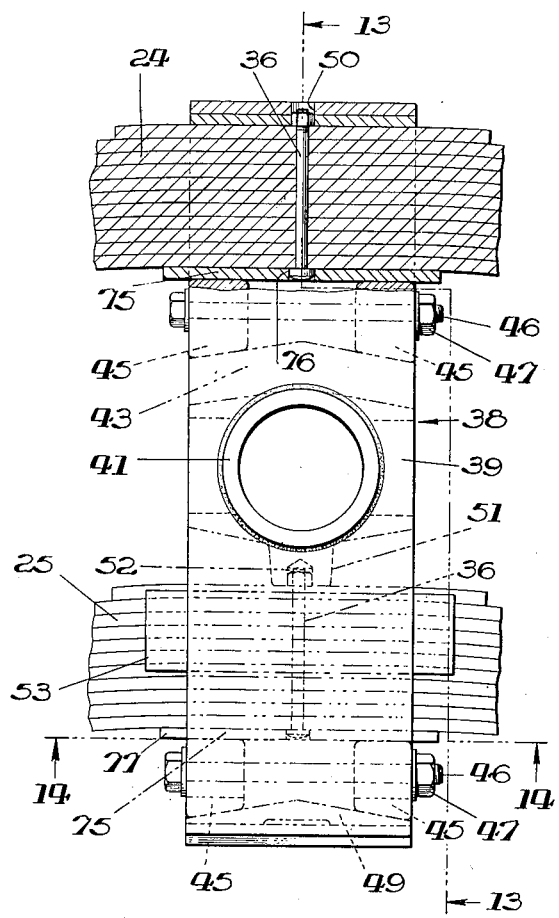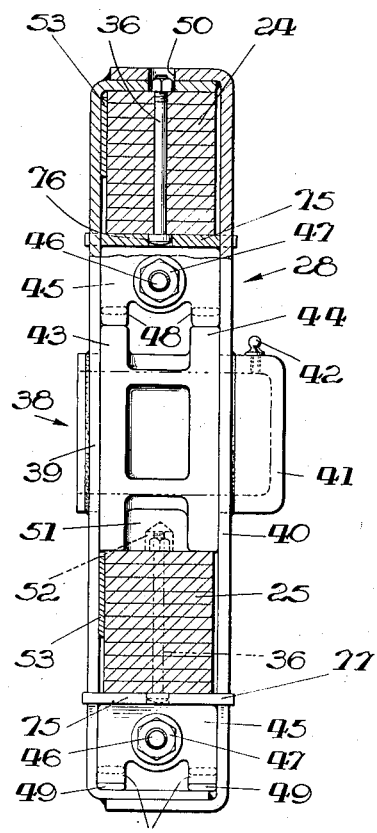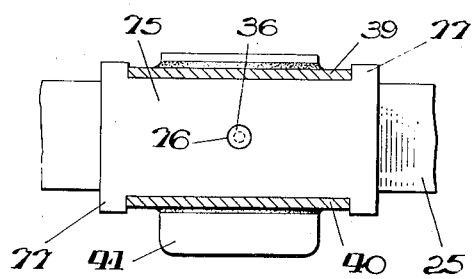

Dec. 22, 1953 W. L. ROMICK 2,663,571
DUAL AXLE UNIT FOR MOTOR VEHICLES
Filed June 2, 1952 7 Sheets-Sheet 6

INVENTOR
William L. Romick
BY Cameron, Kerkam & Sutton
ATTORNEYS

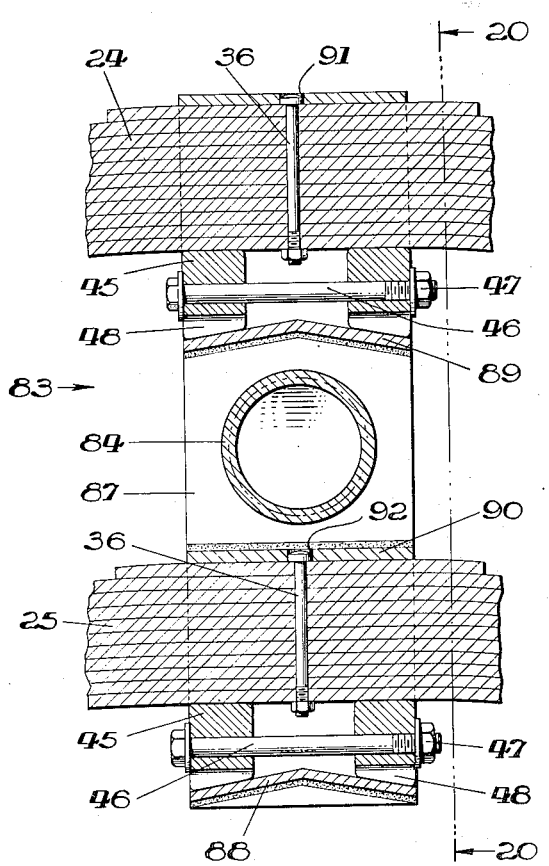
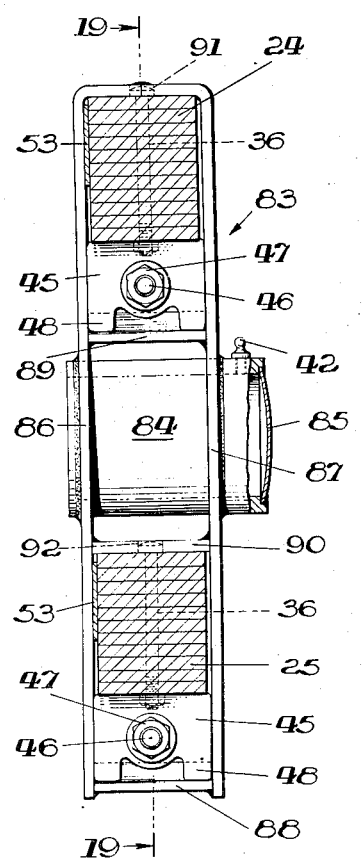
Fig. 19.
Fig. 20.

Patented Dec. 22, 1953

2,663,571

UNITED STATES PATENT OFFICE 2,663,571

DUAL AXLE UNIT FOR MOTOR VEHICLES

William L. Romick, Ferndale, Mich., assignor to Detroit Automotive Products Corporation, Detroit, Mich., a corporation of Michigan Application June 2, 1952, Serial No. 291,142

18 Claims. (Cl. 280—104.5)

This invention relates to dual axle units or bogies for trucks and other heavy duty motor vehicles, and is particularly directed to the provision of an improved form of unit of the type embodying one driving axle and one dead axle which serves to greatly increase the load carrying capacity of any vehicle in which the unit is installed.

Dual axle units of this general type are in widespread use in the trucking industry, but the conventional designs of such bogies are relatively rigid and hard riding and transmit to the vehicle, its load and the driver an undesirable amount of shock during operation. The results are excessive repair and maintenance costs, load damage and driver fatigue.

It is one of the objects of the present invention to provide a dual axle bogie of new and improved construction which is characterized by the flexibility of its suspension and its easy riding qualities, and is yet sufficiently rugged to ensure relatively service-free operation over long periods of time.

Another object is the provision of a novel form of spring assembly for connecting the axles of a unit of the character described to the frame of a truck or other vehicle, which assembly incorporates improved means for transmitting the vehicle load to the axles and for adjusting the spring leaf friction and a unique shackle arrangement which both facilitates articulation and enables effective absorption by the springs of all braking and driving torque reactions.

A further object is to provide a unitary frame bracket, cross beam and trunnion member for dual axle bogies which reduces the weight and simplifies installation of the unit, and also permits maximum articulation without interference with the propeller shaft leading to the rear axle.

These and other objects of the invention will appear more fully upon consideration of the following detailed description of the embodiments of the invention which have been illustrated in the accompanying drawings. It is to be expressly understood, however, that these drawings are exemplary only and are not to be construed as defining the limits of the invention, for which latter purpose reference should be had to the appended claims.

Referring now to the drawings, wherein like reference characters indicate like parts throughout the several views:

Fig. 5 is an enlarged transverse sectional view of the spring hanger construction shown in Fig. 4 taken substantially on the line 5—5 in the latter figure;

Fig. 6 is an exploded perspective view of the central trunnion engaging member of the spring hanger structure and the associated wedge blocks and bolt which serve to frictionally clamp the upper spring to the hanger;

Fig. 7 is a perspective view of the unitary frame bracket, cross beam and trunnion member of the unit shown in Figs. 1-3;

Fig. 12 is an enlarged side view, partially in section, of a modified form of spring hanger construction embodying a locking plate for immobilizing both ends of each spring tie bolt;

Fig. 13 is a transverse sectional view of the structure of Fig. 12 taken substantially on the line 13—13 in the latter figure;

Fig. 14 is a horizontal sectional view of the structure of Fig. 12 taken substantially on the line 14—14 in the latter figure and looking upwardly to show the configuration of the tie bolt locking plate;

Fig. 19 is a longitudinal sectional view of another modified form of spring hanger construction, the section being taken substantially on the line 19—19 in Fig. 20; and Fig. 20 is a transverse sectional view of the structure of Fig. 19 taken substantially on the line 20—20 in the latter figure.

Figure 1:
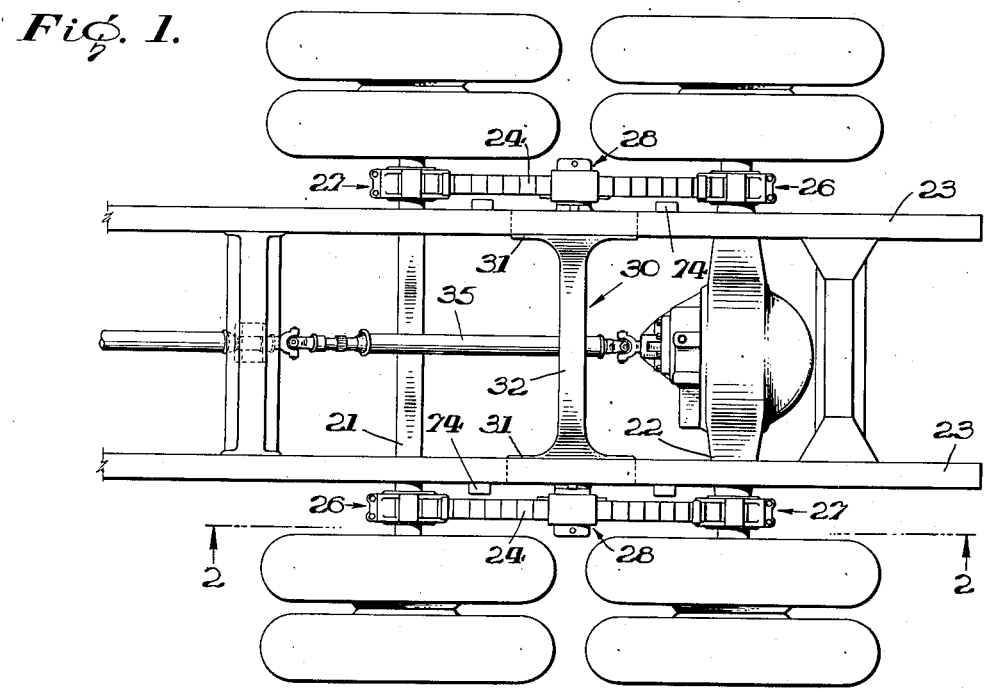
Fig. 1 is a plan view of a dual axle bogie constituting one embodiment of the present invention.
Figure 2:
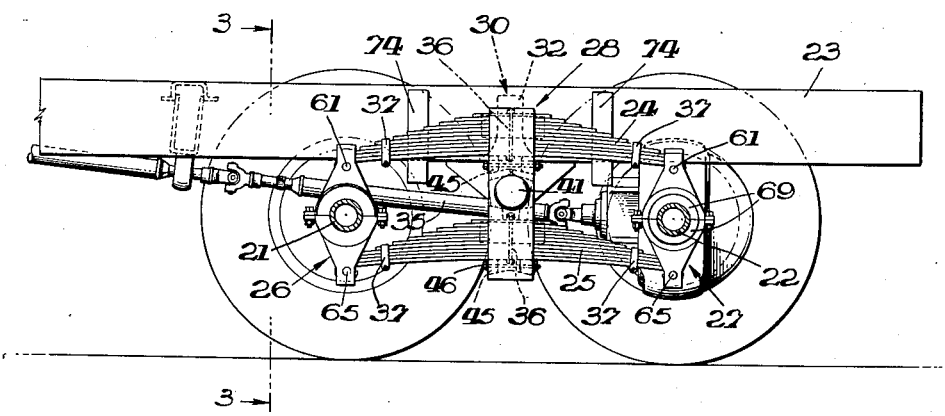
Fig. 2 is a side view of the unit of Fig. 1 with the wheels on one side removed and the axles sectioned along the line 2—2 in Fig. 1.
Figure 3:
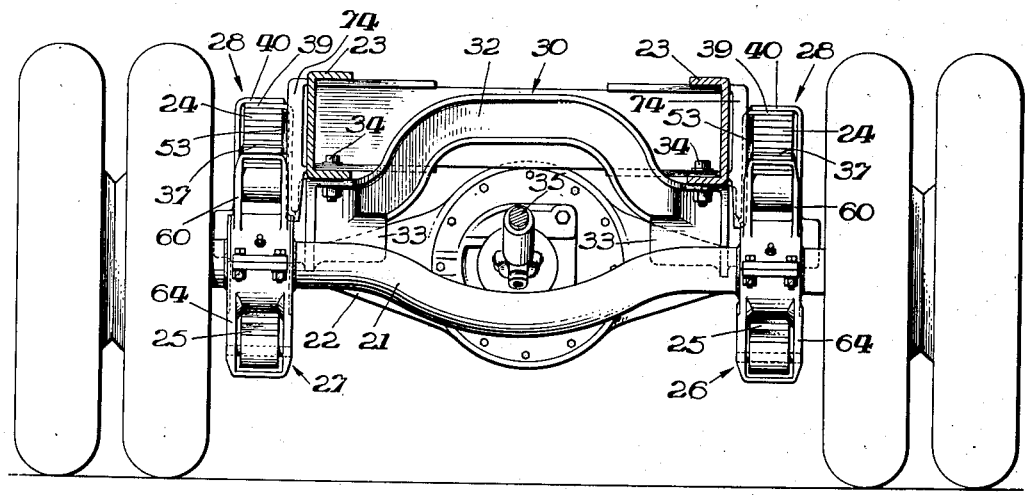
Fig. 3 is an end view of the unit of Figs. 2 and 3 looking rearwardly from the line 3—3 in Fig. 2 with the vehicle frame and propeller shaft sectioned along said line.
Figure 4:
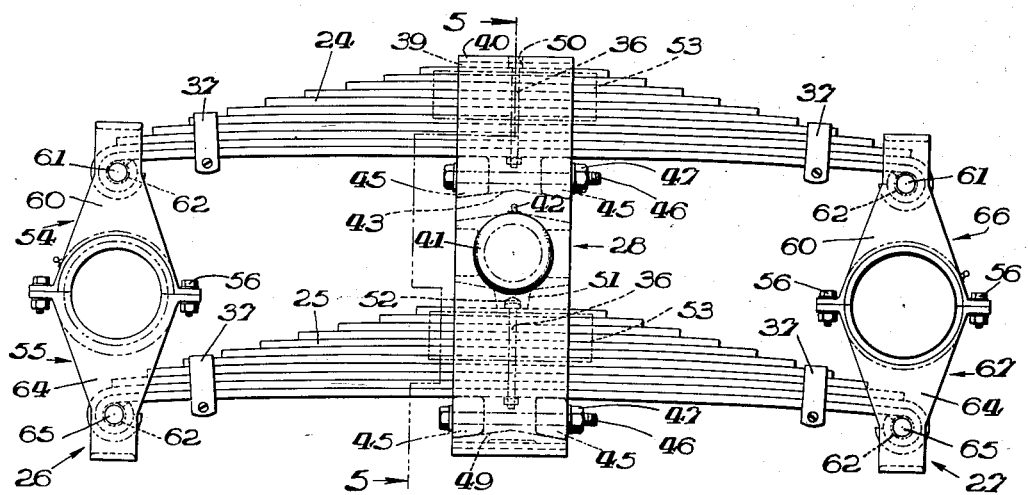
Fig. 4 is a side view on an enlarged scale of one of the parallel spring assemblies of Figs.1-3.

The embodiment of the invention illustrated in Figs. 1, 2 and 3 is a dual axle bogie of the type comprising a front dead axle 21 and a rear driving axle 22 which are connected together and to the channel members 23 of the frame of a truck or other heavy duty motor vehicle by a pair of parallel spring assemblies of the form shown in Fig. 4. Each spring assembly includes an upper leaf spring 24, a lower leaf spring 25, axle mounted spring shackles 26 and 27 interconnecting adjacent ends of the springs, and a spring hanger structure 28 adapted for pivotal mounting on a trunnion 29 which forms part of a unitary center member 30. In the type of bogie illustrated in the drawings, the front axle 21 may be economically formed by a piece of hollow tubing having suitable wheel supporting spindles fixed to the ends thereof, while the rear axle 22 is a conventional driving axle of any desired construction.

As shown best in Fig. 7, the center member 30 comprises a pair of brackets 31 having horizontal longitudinally extending flanges adapted to support the channel members 23 of the vehicle frame and downwardly extending triangular shaped side plates from which the trunnions 29 project, and an upwardly bowed cross beam 32, I-shaped in cross section, connecting the brackets 31. The beam 32 is preferably cast integrally with the brackets 31 and with a pair of trunnion supporting bosses 33 which project inwardly from the vertical side plate portions of the brackets directly beneath the junction between the latter and the cross beam. In the structure illustrated, the trunnions 29 are formed as hollow tubes separately from the integrally cast brackets 31, beam 32 and bosses 33, and are pressed into place in the bosses after the latter have been heated. The combined bracket, beam and trunnion member 30 may be fixed to the vehicle frame in any suitable manner, as by bolts 34 passing through holes drilled in the superposed flanges of channel members 23 and brackets 31. As indicated in Fig. 3, the upward curvature of cross beam 32 is such that the central portion thereof lies above the bottom flanges of channel members 23 and thus provides sufficient clearance for the propeller shaft 35 leading to the rear driving axle 22 to permit maximum articulation of the unit as the vehicle travels over uneven ground without bringing the propeller shaft into contact with the cross beam. The front dead axle 21 is provided with a downwardly bowed central portion for the same purpose.

The detailed construction of the spring suspension by which the axles 21 and 22 are connected to one another and to the vehicle frame is best illustrated in Figs. 4–6 and 8–11. As previously indicated, the spring assembly at each side of the frame comprises a pair of parallel longitudinally extending leaf springs 24 and 25 arranged, respectively, above and below the plane of the axles, shackles 26 and 27 interconnecting the ends of the springs and adapted to be mounted on the axles, and a hanger structure 28 which supports and fixes the central portions of the springs in properly spaced relationship and is adapted for pivotal mounting on one of the trunnions 29 of the center member 30.

Each of springs 24 and 25 consists of a stack of relatively wide spring leaves, eleven leaves 3½" wide being used in the illustrated embodiment, which leaves are held together in properly assembled relationship by a tie or center bolt 36 passing through the central portions of all leaves and a pair of clips 37 surrounding the outer ends of the bottom five leaves of the stack.

The spring hanger structure 28 comprises a central trunnion engaging member 38 and a pair of channel shaped hanger plates 39 and 40 which are welded to one another and to central member 38 to form a spring encircling strap, the assembly of said plates and central member providing spaces of a width slightly greater than that of the spring leaves above and below the central member in which the central portions of the springs are housed. The central member 38 is of the form shown best in Figs. 5 and 6, and consists of a horizontally disposed cylindrical hub 41 adapted to be mounted on one of the trunnions 29, the outer end of said hub being closed and provided with a suitable fitting 42 to ensure proper lubrication of the bearing surfaces, and a pair of laterally spaced vertically extending webs 43 and 44 cast integrally with hub 41 intermediate the inner and outer ends thereof. The hanger plates 39 and 40 are provided with openings intermediate their ends so that said plates may be placed on the hub 41 in contact with the sides of webs 43 and 44 with their flanges in overlapping relationship and then welded to the hub and webs and to one another in the manner indicated in Fig. 5. When the spring hanger has been assembled in this manner, the upper and lower springs 24 and 25 are inserted in the openings thus formed between the central member 38 and the top and bottom of the strap formed by the plates 39 and 40 and then fixed or clamped in proper position by the means next to be described.

As will be seen from Figs. 4, 5 and 6, the spring hanger structure also includes two pairs of wedge blocks 45 and cooperating draw bolts 46 and nuts 47 for forcing the spring leaves of springs 24 and 25 into tight frictional engagement with one another and for clamping the springs to the hanger. Each of wedge blocks 45 has a horizontal top surface adapted to engage the bottom surface of the lowermost leaf of the associated spring, a pair of vertical side surfaces adapted to have a sliding fit with the inner surfaces of hanger plates 39 and 40, and a horizontally extending bore for receiving the draw bolt 46. The bottom portion of each block 45 is so formed as to provide a pair of laterally spaced legs 48 of the same width as webs 43 and 44 of central member 38, the bottom surfaces of said legs sloping at an angle to the horizontal of approximately 10°. Inasmuch as each pair of wedge blocks 45 is adapted to engage the lowermost leaf of one of the springs at positions offset from the center of the spring so as to avoid interference with the lower end of the spring tie bolt 36, the bottom surfaces of the legs 48 slope or incline in opposite directions when the blocks are in place.

In order to effect the desired wedging action, each pair of wedge blocks 45 slidably engages similarly inclined surfaces which are fixed relatively to the spring hanger structure. As shown, the legs of the wedge blocks associated with the upper spring 24 rest on the upper edges of webs 43 and 44 of central member 38, while the blocks associated with lower spring 25 cooperate with a pair of wedge pads 49 which are welded or otherwise fixed to the bottom of the spring encircling strap formed by the overlapped flanges of hanger plates 39 and 40, in the same vertical planes as the webs 43 and 44. The upper edge of each of said webs and wedge pads inclines downwardly in opposite directions from the middle point thereof, i. e., from the center plane of the spring hanger structure, at the same angle as that of the bottom edges of legs 48 of the wedge blocks.

In assembling the springs with the hanger structure, the springs are first centered longitudinally in the spaces between the central member 38 and the top and bottom of the strap formed by the hanger plates 39 and 40, after which the wedge blocks 45 are inserted between the bottom leaves of the springs and the upper edges of webs 43 and 44 and wedge pads 49, respectively, the draw bolts 46 are passed through the wedge blocks and the nuts 47 are tightened so as to force the wedge blocks of each pair toward one another as the legs 48 slide on the cooperating inclined edges of said webs and pads. The wedging action thus produced forces the leaves of each spring upwardly into tight frictional engagement with one another, the top leaf of upper spring 24 also being clamped against the upper flange of hanger plate 39 while the top leaf of lower spring 25 is similarly clamped against the bottom edges of webs 43 and 44 which, as indicated in Figs. 4–6, are horizontal rather than peaked like the upper edges of said webs.

Since the head of tie bolt 36 of the upper spring 24 projects above the top leaf of said spring and would otherwise prevent frictional contact between said top leaf and the upper flange of spring hanger plate 39, said flange and, if desired, the overlapping flange of plate 40 are provided with a hole 50 to receive the bolt head. This construction also facilitates centering of the spring with respect to the hanger structure. Centering of the lower spring 25 may be similarly ensured by casting a downwardly projecting boss 51 integrally with the hub 41 of central member 38 between the webs 43 and 44 and providing said boss with a recess 52 to receive the head of tie bolt 36 of the lower spring.

The spring hanger structure thus described not only permits ready adjustment of the friction between the spring leaves so as to relieve the tie bolts of the shearing stresses resulting from the tendency of the individual spring leaves to move longitudinally relative to one another when the vehicle is in motion, but also enables application of the vehicle load to the tops of the respective springs. While the increased frictional engagement between the spring leaves effected by the wedge blocks will also minimize the tendency of the upper spring leaves to move relatively to one another in a lateral direction by turning about the tie bolt, all such "fanning" action of the spring leaves may be positively prevented by driving a shim plate 53 into the space between the inboard edges of each spring and the adjacent hanger plate 39 and then welding the shim plate to the hanger plate. As shown, the shim plate should extend longitudinally beyond the edges of hanger plate 39 and should have sufficient height to engage at least the uppermost spring leaf encompassed by spring clips 37 and all of the spring leaves thereabove.

As will appear most clearly from Figs. 8–11, the spring shackles 26 and 27 by which the ends of the springs are connected together and to the axles 21 and 22 are not alike, each spring assembly having one shackle 26 which is rigidly fixed to one end of one of the axles, and a shackle 27 which is rotatably mounted on one end of the other axle. In order to enable each spring assembly to effectively absorb its proper share of the driving and braking torque reactions and at the same time provide maximum flexibility from the standpoint of articulation when the vehicle operates over uneven terrain, shackles of like construction are located at diagonally opposite positions. For example, in the bogie illustrated in Fig. 1, the fixed shackles 26 are located at the left-hand end (looking forwardly) of the front axle 21 and at the right-hand end of the rear axle 22, while the two rotatable shackles 27 are mounted on the right-hand end of the front axle and the left-hand end of the rear axle.

Figure 8:
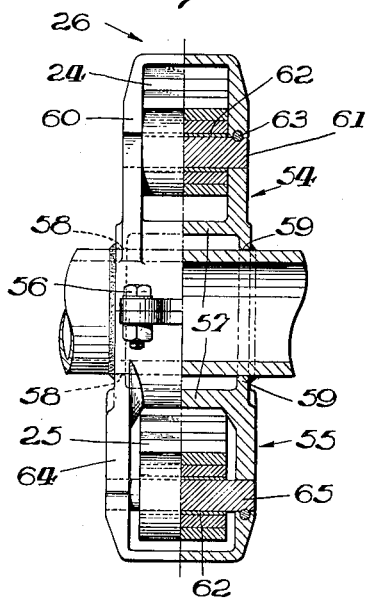
Fig. 8 is an enlarged end view, half in section, of one of the spring shackles of the unit shown in Figs. 1-3, this shackle corresponding to the left-hand shackle of Fig. 2 and being adapted for rigid fixation to one end of an axle.
Figure 9:
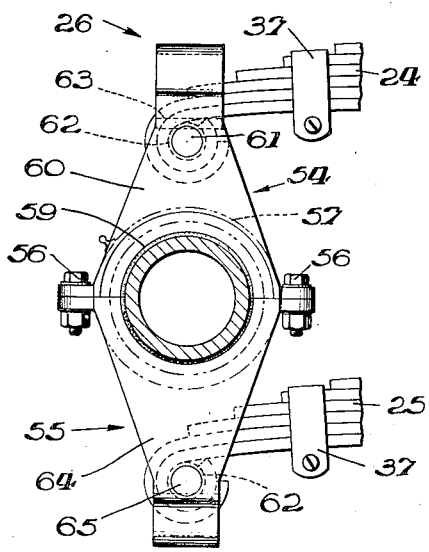
Fig. 9 is a side view of the shackle of Fig. 8.

Referring now to Figs. 8 and 9, each of the fixed shackles 26 comprises an upper half 54 and a lower half 55 of dissimilar construction which are normally secured together by bolts 56. The upper half 54 is provided with a semi-cylindrical hub portion 57 having radially inwardly extending flanges 58 and 59 which engage and are fixed, preferably by welding, to the outer surface of the axle on which the shackle is mounted.

Cast integrally with the hub portion 57 is a radially outwardly extending yoke 60 the cheek plates or ears of which are apertured to receive a pin 61 forming a pivotal connection between one end of the upper spring 24 and the shackle. As shown, the ends of the two lowermost leaves of the spring are curled or wrapped around a sleeve 62 to form a spring eye through which the pin 61 is passed. In order to prevent accidental dislodgment of the pin 61, the latter is notched adjacent one end thereof and one of the ears of yoke 60 is provided with a drilled hole perpendicular to and intersecting the periphery of the aperture receiving the notched end of pin 61, through which hole a lock pin 63 is passed to engage said notch. The lateral distance between the cheek plates or ears of yoke 60 of upper shackle half 54 is only slightly greater than the width of the spring leaves so that the spring eye of the upper spring fits snugly in the yoke with insufficient clearance to permit lateral movement of the end of the spring relative to the shackle by sliding of the sleeve 62 of the spring eye on the pin 61. The connection between the upper half of the shackle and the upper spring thus restricts all relative movement therebetween to a pivotal movement about the axis of the pin.

The lower half 55 of shackle 26 is substantially identical in construction with the upper half 54 except for the dimensions of the yoke and spring pin. As will be seen from Figs. 8 and 9, the cheek plates or ears of yoke 64 of lower shackle half 55 are of different proportions than those of yoke 60 of the upper half so as to make the lateral spacing between the ears of lower yoke 64 sufficiently greater than the width of the leaves of lower spring 25 to permit a limited amount of lateral movement of the eye of said spring with respect to the shackle by sliding of the spring eye sleeve 62 along the proportionately longer spring pin 65. For example, with spring leaves 3½″ wide, the distance between the cheek plates of yoke 64 may be 4½″ so as to leave a clearance of approximately ½″ at each edge of the spring eye.

With this construction, when the axle is inclined with reference to the vehicle frame, as takes place in traveling over uneven ground, the spring eye of the lower spring may adjust its position relative to the shackle by sliding laterally on the spring pin and thereby avoid lateral deflection or rotation of the lower spring, even though the upper spring may be deflected due to the relatively snug grip between the yoke of the upper shackle half and the eye of the upper spring. It has been found that this clearance between the eyes of the lower springs and the associated shackle yokes contribute materially to the increased flexibility and better riding qualities which characterize the bogie of the present invention.

Figure 10:
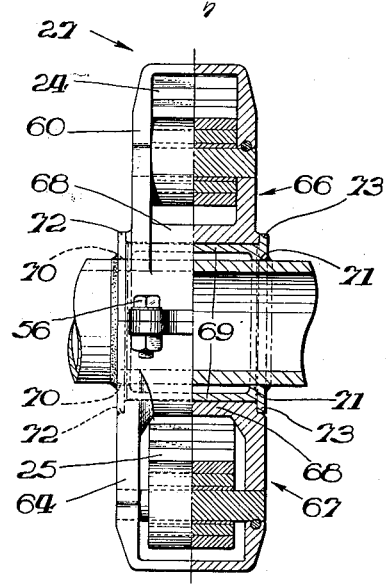
Fig. 10 is an end view, half in section, of another one of the spring shackles of the unit shown in Figs. 1-3, this shackle corresponding to the right-hand shackle of Fig. 2 and being adapted for rotatable mounting on one end of an axle, the opposite end of which carries a shackle like that of Figs. 8 and 9.
Figure 11:
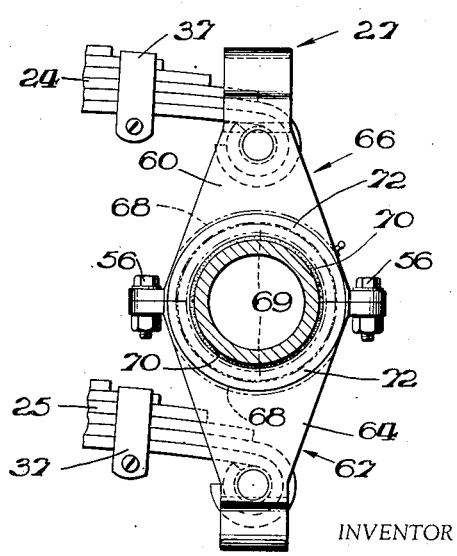
Fig. 11 is a side view of the shackle of Fig. 10.

Each of the rotatable shackles 27 shown in Figs. 10 and 11 also comprises an upper half 66 and lower half 67 connected by bolts 56 as in the case of the fixed shackles 26, and is otherwise of the same construction as the latter except that the hub portions 68 of the rotatable shackle are not provided with radially inwardly extending flanges like those shown at 58 and 59 in Figs. 8 and 9, and instead of being welded or otherwise fixed to the axle, are rotatably mounted on a two-part sleeve 69 having inwardly directed flanges 70 and 71 which engage and are welded to the axle. The sleeve 69 is also provided with outwardly directed flanges 72 and 73 which engage the end surfaces of hub portions 68 of the upper and lower shackle halves 66 and 67 so as to prevent lateral displacement of the shackle with respect to the axle while still permitting relative rotation therebetween. Since, aside from this difference in mounting on the axle, the rotatable shackles 27 embody the same elements as the fixed shackles 26, further detailed description of the structure of Figs. 10 and 11 is unnecessary.

Although the above described clearance between the lower spring eyes and shackle ears increases flexibility of the bogie, excessive lateral movement of the springs and axles with reference to the vehicle frame is prevented by guide plates 74 (see Figs. 1-3) which are welded to the frame channel members 23, two on each side, in such positions as to engage the inner side edges of the upper springs 24 intermediate the spring hanger structures 28 and the shackles 26 and 27. If desired, the guide plates 74 may be so constructed as to engage the sides of the lower springs 25, instead of the upper springs, in which event the ears of the lower shackle halves would closely engage the eyes of the lower springs, and clearance would be provided between the upper shackle ears and the upper spring eyes. If even greater bogie flexibility is required, as in the case of vehicles intended for off-the-highway operation, lateral clearance may be provided between both the upper and the lower spring eyes and their associated shackle ears. In the latter case, however, it will normally be necessary to provide additional means for preventing lateral movement of the axles, such as lateral radius rods or axle guide plates.

While the structure illustrated in Figs. 1-11 is entirely satisfactory for vehicles operating on highways, it has been found desirable, for off-the-highway work, to augment the wedge-produced frictional resistance to longitudinal slippage of the spring leaves by incorporating in the spring hanger construction means for immobilizing both ends of each spring tie bolt against movement in the longitudinal direction of the associated spring.

For example, in Figs. 12-14 there is shown a spring hanger structure which is substantially identical with that illustrated in Figs. 4-6 except that the tie or center bolt 36 of each spring is inverted so that the nut, instead of the head, of said bolt is received in the opening 50 or 52, and a locking plate 75, having an opening 76 to receive and confine the head of the bolt, is interposed between the bottom leaf of each spring and the horizontal top surfaces of each pair of wedge blocks 45. As shown best in Fig. 14, plate 75 fits snugly between spring hanger plates 39 and 40 with its ends projecting beyond the side edges of the latter, each end of plate 75 being provided with laterally extending lugs 77 which engage the edges of the hanger plates and thereby prevent longitudinal movement of the locking plate relative to the hanger. Since the head of each spring tie bolt 36 is received and confined in the opening 76 of one of locking plates 75 while the nut on the other end thereof is similarly housed in either the hole 50 at the upper end of the spring hanger or the recess 52 in the boss 51 of central member 38, it is evident that the spring tie bolts are fixed at both ends relative to the hanger structure so as to augment the resistance to longitudinal movement of the spring leaves provided by the frictional clamping action of wedge blocks 45.

Figure 15:
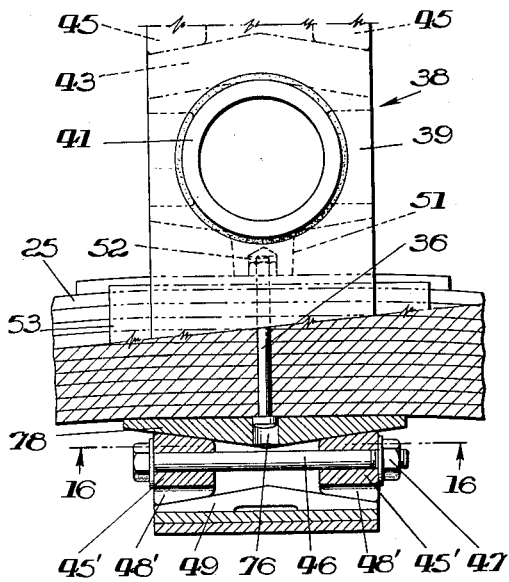
Fig. 15 is a fragmentary side view, partially in section, of a further modification of the spring hanger structure.
Figure 16:
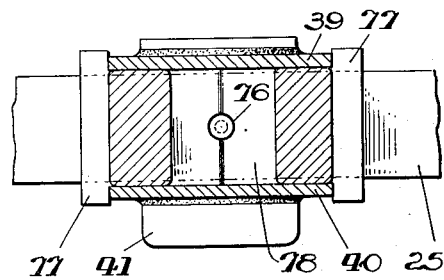
Fig. 16 is a horizontal sectional view taken substantially on the line 16—16, looking upwardly, in Fig. 15.

Instead of making each locking plate flat on both sides as in Figs. 12-14, a tapered or beveled plate 78 of the character illustrated in Figs. 15 and 16 may be used. As there shown, the upper surface of plate 78 is flat for engagement with the bottom surface of the lowermost spring leaf, but its bottom surface is tapered or inclined upwardly in opposite directions from the middle portion thereof, i. e., from a transverse plane through the axis of opening 76. The angularity of the inclined surfaces of plate 78 is preferably the same as that of the upper edges of wedge pads 49, or, when the plate is used in conjunction with the upper spring, the upper edges of webs 43 and 44 of central member 38. With this construction, the wedge blocks 45' are provided with correspondingly tapered or inclined upper surfaces in addition to the sloping bottom surfaces of the legs 48' as in the previously described embodiments.

Figure 17:
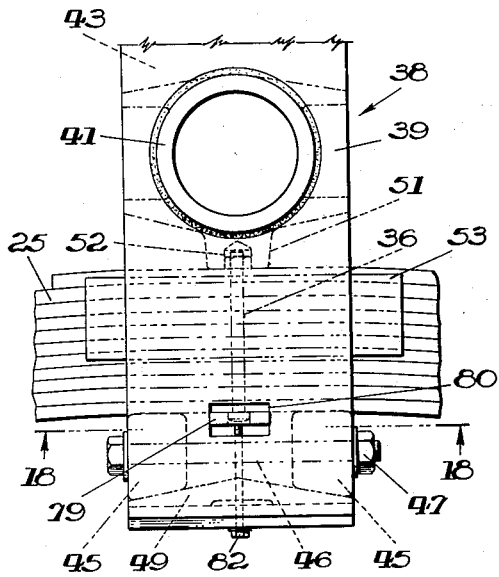
Figs. 17 and 18 are views similar to Figs. 15 and 16 respectively, of still another spring hanger construction.
Figure 18:
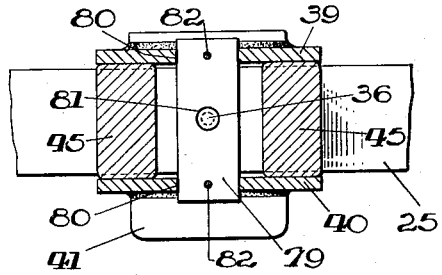

Still another construction for locking both ends of the spring center bolts to the spring hanger is shown in Figs. 17 and 18, although this particular modification is usable only with the bottom springs in the form shown. As illustrated, a relatively narrow locking plate 79 extends transversely through vertically elongated holes 80 in the spring hanger plates 39 and 40, the plate 79 having a centrally positioned opening 81 to receive and confine the head of tie bolt 36 of lower spring 25. In order to maintain the plate 79 in engagement with the lowermost leaf of spring 25 in position to receive the head of bolt 36, a pair of adjusting screws 82 extend upwardly through threaded bores in hanger plates 39 and 40 so as to engage and support the locking plate 79 on their upper ends. With this arrangement, the wedge blocks 45 are in direct contact with the bottom surface of the lowermost leaf of spring 25 as in the embodiment of Figs. 4-6, the width of locking plate 79 being substantially less than the distance between the adjacent faces of the wedge blocks so as not to interfere with proper adjustment of the latter.

Figs. 19 and 20 show a modified form of spring hanger structure 83 which is interchangeable with those previously described, is relatively light in weight and may be built up by welding together rolled, drawn or stamped steel shapes without the use of castings. As shown, the structure 83 comprises a cylindrical trunnion engaging sleeve 84, closed at its outer end by a dished cap 85 welded thereto, and a pair of vertically elongated plates 86 and 87 of inverted L-shape which are welded to sleeve 84 with the ends of their horizontal legs in abutment with and welded to one another. The lower ends of plates 86 and 87 are interconnected by a wedge pad 88 which is welded to the plates, while an upper wedge pad 89 is similarly fixed to said plates just above sleeve 84. There is also welded to plates 86 and 87 just below sleeve 84 a horizontal thrust plate 90 which forms with lower wedge pad 88 a space for receiving the lower spring 25. The space between upper wedge pad 89 and the top of the spring encircling strap formed by the abutting legs of plates 86 and 87 receives the upper spring 24. The upper surface of each of wedge pads 88 and 89 inclines downwardly in opposite directions from the transverse center line thereof at the same angle as that of the bottom edges of legs 48 of wedge blocks 45 which are slidably supported thereon; for ease and economy of manufacture, the wedge pads may be stamped into the pitched shape shown from flat stock. In order to facilitate centering of the springs with respect to the hanger structure, the upper end of the spring encircling strap formed by plates 86 and 87 and the thrust plate 90 are provided with drilled holes 91 and 92, respectively, to receive the upper ends of spring tie bolts 36.

It will be understood that the spring hanger structure of Figs. 19 and 20 may also incorporate, if desired, locking plates similar to those shown in Figs. 12-18, in which event the holes 91 and 92 will perform the additional function of immobilizing the upper ends of the spring tie bolts against movement in the longitudinal direction of the springs.

There is thus provided by the present invention an improved form of dual axle unit for trucks and other motor vehicles adapted to carry heavy loads which embodies a more flexible, easier riding suspension than bogies of the same general type heretofore known. The structure of the invention includes in combination novel means for mounting the springs on the vehicle and novel means for connecting the springs to the axles, a combination which results in better articulation, more effective absorption of braking and driving torque reactions, decreased weight without sacrifice of strength, and easier installation. The manner in which these advantages are attained will be evident from the foregoing description.

While several specifically different devices have been described and illustrated in the accompanying drawings, it will be obvious that the invention is not limited to the particular structures shown, but is capable of a variety of mechanical embodiments. For example, although the unit disclosed is of the type embodying one dead axle and one driving axle, it is evident that the invention is also applicable to dual axle units wherein both axles are adapted to drive or both are trailing axles. It is also apparent that the particular forms of axles and springs illustrated in the drawings may be replaced by equivalent elements of other types and sizes at the option of the manufacturer. Various other changes, which will now suggest themselves to those skilled in the art, may be made in the form, details of construction and arrangement of the parts without departing from the inventive concept. Reference is therefore to be had to the appended claims for a definition of the limits of the invention.

What is claimed is:

1. In a dual axle unit for motor vehicles, the combination with the axles of a center member disposed therebetween and adapted for connection to a vehicle frame, a pair of trunnions projecting laterally from said center member, and a pair of spring assemblies pivotally mounted intermediate their ends on said trunnions, each of said spring assemblies including an upper and a lower leaf spring, a spring hanger having a central member into which the trunnion extends and a spring encircling strap fixed to said central member and forming therewith spring receiving openings above and below said central member, means for fixing said springs to said hanger with their central portions housed in said openings, and shackles mounted on said axles interconnecting the ends of said upper and lower springs, the connection between each shackle and one of said springs restricting all relative movement therebetween to a pivotal movement about an axis parallel to the axis of the axle on which said shackle is mounted while the connection between said shackle and the other spring permits relative lateral movement parallel to, as well as pivotal movement about, another axis parallel to the axis of said axle.

2. In a dual axle unit for motor vehicles, the combination with the axles of a center member disposed therebetween and adapted for connection to a vehicle frame, a pair of trunnions projecting laterally from said center member, and a pair of spring assemblies pivotally mounted intermediate their ends on said trunnions, each of said spring assemblies including an upper and a lower leaf spring, a spring hanger having a central member into which the trunnion extends and a spring encircling strap fixed to said central member and forming therewith spring receiving openings above and below said central member, means for fixing said springs to said hanger with their central portions housed in said openings, and shackles mounted on said axles interconnecting the ends of said upper and lower springs, each of the connections between said shackles and spring ends including an eye in the end of the spring and a pin passing through said eye, each of said shackles having an upper and a lower pair of ears for supporting said pins and between which the spring eyes are retained, the distance between the ears of one of said pairs being substantially equal to the width of the associated spring eye while the distance between the ears of the other pair is substantially greater than the width of the associated spring eye.

3. In a dual axle unit for motor vehicles, the combination with the axles of a center member disposed therebetween and adapted for connection to a vehicle frame, a pair of trunnions projecting laterally from said center member, and a pair of spring assemblies pivotally mounted intermediate their ends on said trunnions, each of said spring assemblies including an upper and a lower leaf spring, a spring hanger having a central member into which the trunnion extends and a spring encircling strap fixed to said central member and forming therewith spring receiving openings above and below said central member, the central portions of said upper and lower springs being housed in said openings, wedging means interposed between the lowermost leaf of the upper spring and said central member for increasing the frictional engagement between the leaves of said upper spring and for clamping said spring to said hanger, and wedging means interposed between the lowermost leaf of the lower spring and the lower end of said strap for increasing the frictional engagement between the leaves of said lower spring and for clamping said spring to said hanger, and shackles mounted on said axles interconnecting the ends of said upper and lower springs, the connection between each shackle and one of said springs restricting all relative movement therebetween to a pivotal movement about an axis parallel to the axis of the axle on which said shackle is mounted while the connection between said shackle and the other spring permits relative lateral movement parallel to, as well as pivotal movement about, another axis parallel to the axis of said axle.

4. A dual axle unit as defined in claim 3 wherein each of the connections between said shackles and spring ends includes an eye in the end of the spring and a pin passing through said eye, each of said shackles having an upper and a lower pair of ears for supporting said pins and between which the spring eyes are retained, the distance between the ears of one of said pairs being substantially equal to the width of the associated spring eye while the distance between the ears of the other pair is substantially greater than the width of the associated spring eye.

5. In a dual axle unit for motor vehicles, the combination with the axles of a center member disposed therebetween and adapted for connection to a vehicle frame, a pair of trunnions projecting laterally from said center member, and a pair of spring assemblies pivotally mounted intermediate their ends on said trunnions, each of said spring assemblies including an upper and a lower leaf spring, a spring hanger having a central member into which the trunnion extends and a spring encircling strap fixed to said central member and forming therewith spring receiving openings above and below said central member, means for fixing said springs to said hanger with their central portions housed in said openings, and shackles mounted on said axles interconnecting the ends of said upper and lower springs, one pair of diagonally opposite shackles being rigidly fixed to the axles on which they are mounted and the other pair being rotatably mounted on their respective axles, the connection between each shackle and one of the springs which it interconnects restricting all relative movement therebetween to a pivotal movement about an axis parallel to the axis of the axle on which said shackle is mounted while the connection between said shackle and the other spring permits relative lateral movement parallel to, as well as pivotal movement about, another axis parallel to the axis of said axle.

6. In a dual axle unit for motor vehicles, the combination with the axles of a center member disposed therebetween and adapted for connection to a vehicle frame, a pair of trunnions projecting laterally from said center member, and a pair of spring assemblies pivotally mounted intermediate their ends on said trunnions, each of said spring assemblies including an upper and a lower leaf spring, a spring hanger having a central member into which the trunnion extends and a spring encircling strap fixed to said central member and forming therewith spring receiving openings above and below said central member, means for fixing said springs to said hanger with their central portions housed in said openings, and shackles mounted on said axles interconnecting the ends of said upper and lower springs, one pair of diagonally opposite shackles being rigidly fixed to the axles on which they are mounted and the other pair being rotatably mounted on their respective axles, each of the connections between said shackles and spring ends including an eye in the end of the spring and a pin passing through said eye, each of said shackles having an upper and a lower pair of ears for supporting said pins and between which the spring eyes are retained, the distance between the ears of the upper pair being substantially equal to the width of the associated spring eye while the distance between the ears of the lower pair is substantially greater than the width of the associated spring eye.

7. In a dual axle unit for motor vehicles of the type wherein at least the rear one of the two axles is a driving axle, the combination with said axles of a center member disposed between the axles adapted for connection to a vehicle frame, said member comprising a pair of laterally spaced frame brackets having longitudinally extending flanges for supporting the vehicle frame and downwardly extending side plates integral with said flanges, an upwardly bowed cross beam integral with said frame brackets and so shaped that the bottom surface of its central portion lies above the plane of said flanges, and a pair of trunnions projecting laterally from said side plates, and a pair of spring assemblies pivotally mounted intermediate their ends on said trunnions, each of said spring assemblies including an upper and a lower leaf spring, a spring hanger having a central member into which the trunnion extends and a spring encircling strap fixed to said central member and forming therewith spring receiving openings above and below said central member, means for fixing said springs to said hanger with their central portions housed in said openings, and shackles mounted on said axles interconnecting the ends of said upper and lower springs.

8. A spring assembly for a dual axle unit of the character described comprising a pair of parallel leaf springs arranged one above the other, a spring hanger structure supporting and fixing the central portions of said springs in vertically spaced relationship, and a pair of shackles interconnecting the ends of said springs and adapted to be mounted on the axles of said unit, said spring hanger structure including a central trunnion receiving member, a spring encircling strap fixed to said central member and forming therewith spring receiving openings above and below said central member, the central portions of said springs being housed in said openings, wedging means interposed between the lowermost leaf of the upper spring and said central member for increasing the frictional engagement between the leaves of the upper spring and clamping said spring against the upper end of said strap, wedging means interposed between the lowermost leaf of the lower spring and the lower end of said strap for increasing the frictional engagement between the leaves of said lower spring and for clamping said spring against a surface beneath and fixed relatively to said central member, and means in addition to said wedging means for resisting longitudinal movement of the leaves of one of said springs relative to said spring hanger structure, said means comprising a tie bolt passing through the central portions of the leaves of said spring, an opening in said spring hanger structure for receiving and confining one end of said tie bolt, a member positioned in the spring receiving opening in which the central portion of said spring is housed and having an opening therein for receiving and confining the other end of said tie bolt, and means for preventing movement of said member relative to said spring hanger structure in the longitudinal direction of said spring.

9. A spring assembly for a dual axle unit of the character described comprising a pair of parallel leaf springs arranged one above the other, a spring hanger structure supporting and fixing the central portions of said springs in vertically spaced relationship, and a pair of shackles interconnecting the ends of said springs and adapted to be mounted on the axles of said unit, said spring hanger structure including a central trunnion receiving member, a spring encircling strap comprising a pair of laterally spaced plates fixed to and extending vertically above and below said central member and having their upper and lower ends connected together to form the upper and lower ends of the strap, said strap forming with said central member spring receiving openings above and below said member in which the central portions of said springs are housed, wedging means interposed between the lowermost leaf of the upper spring and said central member for increasing the frictional engagement between the leaves of the upper spring and for clamping said spring against the upper end of said strap, wedging means interposed between the lowermost leaf of the lower spring and the lower end of said strap for increasing the frictional engagement between the leaves of said lower spring and for clamping said spring against a surface beneath and fixed relatively to said central member, a tie bolt passing through the central portions of the leaves of each of said springs, an opening in the upper end of said spring encircling strap for receiving and confining the upper end of the tie bolt of said upper spring, an opening in said surface beneath said central member for receiving and confining the upper end of the tie bolt of said lower spring, a pair of plates positioned in said spring receiving openings and having openings therein for receiving and confining the lower ends of said tie bolts, and means for preventing movement of said plates relative to said spring encircling strap in the longitudinal direction of said springs.

10. A spring assembly for a dual axle unit of the character described comprising a pair of parallel leaf springs arranged one above the other, a spring hanger structure supporting and fixing the central portions of said springs in vertically spaced relationship, and a pair of shackles interconnecting the ends of said springs and adapted to be mounted on the axles of said unit, said spring hanger structure including a central trunnion receiving member, means providing a surface above and fixed relatively to said central member which inclines downwardly in opposite directions from the center plane of said spring hanger structure, a spring encircling strap fixed to said central member and forming therewith spring receiving openings above and below said central member, the central portions of said springs being housed in said openings, means at the lower end of said strap providing a surface fixed relatively to said strap which inclines downwardly in opposite directions from the center plane of said spring hanger structure, a pair of wedge blocks having substantially horizontal upper surfaces adapted to support the upper spring at positions on opposite sides of the center thereof and oppositely inclined lower surfaces of the same angularity as, and slidably supported on, the surface above said central member, a second pair of wedge blocks having substantially horizontal upper surfaces adapted to support the lower spring at positions on opposite sides of the center thereof and oppositely inclined lower surfaces of the same angularity as, and slidably supported on, the surface at the lower end of said strap, means for forcing the wedge blocks of each of said pairs toward one another so as to increase the frictional engagement between the leaves of said upper and lower springs and clamp said springs against the upper end of said strap and a surface beneath and fixed relatively to said central member, respectively, and means in addition to said wedge blocks for resisting longitudinal movement of the leaves of said springs relative to said spring hanger structure, said means comprising a tie bolt passing through the central portions of the leaves of each of said springs, openings in said spring hanger structure for receiving and confining the upper ends of said tie bolts, a pair of plates positioned in said spring receiving openings and having openings therein for receiving and confining the lower ends of said tie bolts, and means for fixing said plates against movement relative to said spring encircling strap in the longitudinal direction of said springs.

11. A spring assembly for a dual axle unit of the character described comprising a pair of parallel leaf springs arranged one above the other, a spring hanger structure supporting and fixing the central portions of said springs in vertically spaced relationship, and a pair of shackles interconnecting the ends of said springs and adapted to be mounted on the axles of said unit, said spring hanger structure including a central member having a horizontally disposed trunnion receiving hub and a pair of laterally spaced webs extending above and below said hub, a spring encircling strap consisting of a pair of channel shaped plates fixed to and extending vertically above and below said central member and having their flanges secured together to form the upper and lower ends of the strap, said strap forming with said central member spring receiving openings above and below said member in which the central portions of said springs are housed, a pair of wedge pads supported by the lower end of said strap and positioned in the same vertical planes as said webs, the upper edge of each of said webs and wedge pads inclining downwardly in opposite directions from the center plane of said spring hanger structure, a pair of wedge blocks having substantially horizontal upper surfaces engaging the bottom of the upper spring at positions on opposite sides of the center thereof and oppositely inclined lower surfaces of the same angularity as, and slidably supported on, the upper edges of said webs, a second pair of wedge blocks having substantially horizontal upper surfaces engaging the bottom of the lower spring at positions on opposite sides of the center thereof and oppositely inclined lower surfaces of the same angularity as, and slidably supported on, the upper edges of said wedge pads, and means for forcing the wedge blocks of each of said pairs toward one another so as to increase the frictional engagement between the leaves of said upper and lower springs and clamp said springs against the upper end of said strap and the lower edges of said webs, respectively.

12. A spring assembly for a dual axle unit of the character described comprising a pair of parallel leaf springs arranged one above the other, a spring hanger structure supporting and fixing the central portions of said springs in vertically spaced relationship, and a pair of shackles interconnecting the ends of said springs and adapted to be mounted on the axles of said unit, said spring hanger structure including a central trunnion receiving member, a spring encircling strap comprising a pair of laterally spaced plates fixed to and extending vertically above and below said central member, horizontal flanges at the upper ends of said plates secured together to form the upper end of the strap and a first member interconnecting said plates adjacent the lower ends thereof to form the lower end of the strap, said first member having an upper surface which inclines downwardly in opposite directions from the center plane of said spring hanger structure, a second member fixed to said strap-forming plates above said central member and also having an upper surface which inclines downwardly in opposite directions from the central plane of said spring hanger structure, a third member fixed to said strap-forming plates beneath said central member and having a substantially horizontal lower surface, said spring encircling strap forming with said first, second and third members spring receiving openings above and below said central member, the central portions of said springs being housed in said openings, a pair of wedge blocks having substantially horizontal upper surfaces adapted to support the upper spring at positions on opposite sides of the center thereof and oppositely inclined lower surfaces of the same angularity as, and slidably supported on, the upper surface of said second member, a second pair of wedge blocks having substantially horizontal upper surfaces adapted to support the lower spring at positions on opposite sides of the center thereof and oppositely inclined lower surfaces of the same angularity as, and slidably supported on, the upper surface of said first member, and means for forcing the wedge blocks of each of said pairs toward one another so as to increase the frictional engagement between the leaves of said upper and lower springs and clamp said springs against the upper end of said strap and the lower surface of said third member, respectively.

13. A spring assembly as defined in claim 12 including a tie bolt passing through the central portions of the leaves of each of said springs, and openings in the upper end of said spring encircling strap and in said third member for receiving and confining the upper ends of said tie bolts.

14. A spring assembly for a dual axle unit of the character described comprising a pair of parallel leaf springs arranged one above the other, a spring hanger structure supporting and fixing the central portions of said springs in vertically spaced relationship, and a pair of shackles interconnecting the ends of said springs and having hubs by which they are adapted to be mounted on the axles of said unit, the connection between each shackle and one of said springs restricting all relative movement therebetween to a pivotal movement about an axis parallel to the axis of the shackle hub while the connection between said shackle and the other spring permits relative lateral movement parallel to, as well as pivotal movement about, another axis parallel to the axis of said hub.

15. A spring assembly for a dual axle unit of the character described comprising a pair of parallel leaf springs arranged one above the other, a spring hanger structure supporting and fixing the central portions of said springs in vertically spaced relationship, and a pair of shackles interconnecting the ends of said springs and adapted to be mounted on the axles of said unit, each of the connections between said shackles and spring ends including an eye in the end of the spring and a pin passing through said eye, each of said shackles having an upper and a lower pair of ears for supporting said pins and between which the spring eyes are retained, the distance between the ears of one of said pairs being substantially equal to the width of the associated spring eye while the distance between the ears of the other pair is substantially greater than the width of the associated spring eye.

16. A spring assembly for a dual axle unit of the character described comprising a pair of parallel leaf springs arranged one above the other, a spring hanger structure supporting and fixing the central portions of said springs in vertically spaced relationship, and a pair of shackles interconnecting the ends of said springs and adapted to be mounted on the axles of said unit, each of said springs having an eye at each end and each of said shackles including an upper and a lower yoke into which the eyes of the springs extend and pins carried by said yokes to which said eyes are pivotally connected, the spacing between the parallel side walls of each of said lower yokes exceeding the width of the associated spring eye sufficiently to enable relative movement between said yoke and said eye parallel to the axis of the pin to which said eye is pivotally connected.

17. A spring assembly for a dual axle unit of the character described comprising a pair of parallel leaf springs arranged one above the other, a spring hanger structure supporting and fixing the central portions of said springs in vertically spaced relationship, and a pair of shackles interconnecting the ends of said springs and adapted to be mounted on the axles of said unit, each of said springs having an eye at each end and each of said shackles including an upper and a lower yoke into which the eyes of the springs extend and pins carried by said yokes to which said eyes are pivotally connected, the upper yoke of each shackle having cheek plates which snugly embrace the edges of the associated spring eye to prevent relative movement between said eye and said yoke parallel to the axis of the pin to which said eye is pivotally connected, and the lower yoke of each shackle having cheek plates which are so spaced as to leave a substantial clearance between them and the edges of the associated spring eye to enable movement of said eye relative to said yoke parallel to the axis of the pin to which said eye is pivotally connected.

18. In a dual axle unit for motor vehicles of the type wherein at least the rear one of the two axles is a driving axle, a center member adapted to be disposed between the axles for connecting the unit to a vehicle frame comprising a pair of laterally spaced longitudinally extending flanges for supporting the vehicle frame, a pair of vertical side plates extending downwardly from said flanges, an upwardly bowed cross beam connecting said flanges and side plates and so shaped that the bottom surface of its central portion lies above the horizontal plane of said flanges, a hollow boss carried by each of said side plates directly below the junction between the associate flange and side plate and the cross beam, said flanges, side plates, cross beam and bosses being formed as an integral casting, and a pair of separately formed trunnions mounted in said bosess and projecting laterally outwardly from said side plates.

WILLIAM L. ROMICK.

References Cited in the file of this patent

UNITED STATES PATENTS

| Number | Name | Date |
|---|---|---|
| 1,899,913 | McCuen | Feb. 28, 1933 |
| 1,936,834 | Fagoel | Nov. 28, 1933 |
| 2,238,001 | Pointer | Apr. 8, 1941 |
| 2,300,557 | Dondlinger | Nov. 3, 1942 |
| 2,312,163 | Hingley | Feb. 23, 1943 |